Patented Oct. 7, 1952

2,613,147

UNITED STATES PATENT OFFICE 2,613,147

METHOD OF PRODUCING A PLANT FOOD AND PLANT STIMULANT, AND UTILIZATION THEREOF

William L. Owen, Baton Rouge, and
Albert J. Isacks, Houma, La.

No Drawing. Application May 6, 1949,
Serial No. 91,868

15 Claims. (Cl. 71—26)

The present invention relates to the treatment of soil with a plant growth stimulant and a plant food comprising a substantially dewaxed sugar cane mud.

In one form of the invention, the soil is treated with a dewaxed sugar cane mud which has a microbial population at least equivalent to that present in the original sugar cane mud before removal of the wax constituents.

It has been discovered that the removal of the wax from the sugar cane mud makes the plant food that it contains more readily available for utilization by plants. The supplemental discovery has been made that, in removing the wax from the filter press mud, and this is accomplished by solvent extraction, there is an initial decrease in the microbial population.

It has been further discovered that the microbial population of the dewaxed sugar cane mud may be increased so that the microbial population is at least equivalent to that present in the original sugar cane mud before removal of the wax constituents. From a method standpoint, this removal is accomplished by solvent treatment. More specifically, the dewaxed sugar cane mud may be treated with almost any volatile solvent which has substantially little germicidal effect on the microbial population of the mud. The solvent has the property, in a number of cases, of first depressing the initial rate of growth of the micro-organisms present in the sugar cane mud and later on stimulating the reproductive powers of said micro-organisms, prior to the time that the so-treated dewaxed sugar cane mud is introduced into the soil and after the dewaxed sugar cane mud has been introduced into the soil.

More specifically, after the wax present in the sugar cane mud has been removed by solvent extraction, with the resultant reduction in the microbial population of the filter press mud, the latter is then treated with a solvent material of the character above set forth, with the result that the micro-organisms have conferred thereon a rest period, as far as reproduction is concerned, after which period the organisms become invigorated and grow relatively rapidly. It therefore appears that one result of treating the dewaxed sugar cane mud with a solvent of the character set forth is to provide a rest period for the micro-organisms, including those beneficent species which function as a plant growth stimulant and plant food.

It has further been discovered that the dewaxed sugar cane mud may be inoculated with cultures of the soil micro-organisms, and the so-provided product mixed with soil, said material functioning to greatly stimulate the growth of plants in the soil to which the material is added. It has been discovered that when substantially completely dewaxed sugar cane mud is subjected to solvent treatment, after reinoculating the dewaxed sugar cane mud with bacterial flora, such as found in fertile soils, the increase in bacteria present in the soil to which the inoculated dewaxed filter press or sugar cane mud has been added, greatly exceeds the bacterial growth in the soil resulting from the treatment of the soil with filter press mud containing its original wax and waxy constituents. This phenomenon becomes more pronounced when the dewaxed filter press mud is subject to solvent treatment as above set forth and then reinoculated with a bacterial flora such as found in fertile soils.

It may be pointed out that the present invention, in one of its forms, comprises introducing into the soil, as a preformed entity, dewaxed sugar cane mud which has been inoculated with cultures of soil micro-organisms and, more specifically, the preformed material which is introduced into the soil, may comprise dewaxed sugar cane mud which has a microbial population at least equivalent to that present in the original sugar cane mud before the removal of the wax and waxy constituents, said dewaxed mud being inoculated with cultures of soil micro-organisms.

In one form of the invention a protein may be mixed with the dewaxed sugar cane mud which has had its microbial population reduced to the extraction of the wax from the original sugar cane mud, or mixed with dewaxed sugar cane mud which has a microbial population at least equivalent to that present in the original sugar cane mud before removal of the wax constituents, or with either of said types of dewaxed sugar cane mud, which have been impregnated with or mixed with cultures of soil micro-organisms.

From a product standpoint, the invention is directed to a preformed plant growth stimulant and plant food comprising 1. Dewaxed sugar cane mud inoculated with cultures of soil micro-organisms;

2. Dewaxed sugar cane mud having a microbial population at least equivalent to that present in the sugar cane mud before the removal of the wax constituents;

3. Dewaxed sugar cane mud having a microbial population at least equivalent to that present in the original sugar cane mud before the removal of the wax constituents, said mud being inoculated with cultures of soil micro-organisms;

4. A mixture of dewaxed sugar cane mud and a volatile solvent having substantially little germicidal effect on the microbial population of the mud, said volatile solvent having the property of first depressing the rate of growth of the microbial population of the mud and then later, stimulating the reproductive powers of the micro-organisms present in the mud.

5. A mixture of dewaxed sugar cane mud and a volatile liquid hydrocarbon or a hydrocarbon derivative solvent having substantially little germicidal effect on the microbial population of the mud, said volatile solvent having the property of first depressing the rate of growth of the microbial population of the mud and then later, stimulating the reproductive powers of the micro-organisms in the mud.

6. In any of the compositions herein identified as number 1 to 5 inclusive, there may be added a protein material in an amount broadly between 5% and 20% taken on the dry weight of the dewaxed sugar cane mud and more narrowly between 10% and 20% taken on the dry weight of the dewaxed sugar cane mud. Any waste protein product may be used as, for example, one containing 10% protein and 27% ash, chiefly potash. The amount of protein which is added to the sugar cane mud is understood to refer to the protein product itself. The protein product usually may contain between 5% and 15% or 20% of protein matter. Therefore, when it is stated that the filter press mud may have 5% of the protein product added thereto, it is understood that it is 5% of a product containing 10% of protein, so that the actual amount of protein available is about a half of one percent, taken on the dry weight of the filter press mud. It is immaterial that there is a greater percentage of protein. The sugar cane mud will also be effective with or without the presence of the protein, but it is more effective when it is mixed with a protein material which may be present merely in traces or may be present in percentages of the order herein set forth.

In the plant stimulant and food composition herein designated number 5, the liquid hydrocarbons may include liquid hydrocarbons as, for example, benzene, toluene, the xylenes, hexanes, octanes, nonanes or any compatible mixture of any of said hydrocarbons in any proportion. The liquid hydrocarbon may also comprise cyclic hydrocarbons, such as benzol, or a saturated cyclic hydrocarbon as, for example, cyclohexane. The solvent may also comprise a liquid petroleum fraction distilling substantially completely at a temperature between about 190° and about 230° F., inclusive. The hydrocarbon derivatives include the chlorinated hydrocarbons exemplified by carbon tetrachloride, chloroform, acetylene tetrachloride, ether, carbon bisulphide and acetone.

In fact, almost any liquid solvent may be used which is volatile at ordinary temperatures and pressures; has substantially little germicidal effect on the microbial population of the mud; has a relatively limited solubility in water and preferably is substantially insoluble in water. Preferably, although not necessarily, the activating treatment liquid for the dewaxed sugar cane mud should be substantially immiscible with the water. It is also preferred that the activating treatment liquid be an organic liquid.

The present invention is also directed to a method of preparing a plant food stimulant as hereinafter more fully set forth.

It is desired to state that the sugar cane mud, which is utilized in accordance with the present invention, is the filter press cake resulting from the filtration of the scums and settlings in raw sugar factories, incident to clarification. It is well known that in the extraction of sugar juice from sugar cane the cut cane is fed to crusher rolls which function to express the juice from the rolls. The sugar cane is then macerated with water as, for example, wash water, and then repressed. This repressing is carried out as often as necessary in order to insure a substantially complete recovery of the sugar content of the cane. Thereafter, the cane juice, including that from the repeated pressings, is treated with slaked lime or its equivalent and heated to a temperature varying from about 212° to 220° F., whereby precipitation of impurities, such as certain phosphate compounds and products, is effected. The so-treated juice is permitted to stand, the impurities present in the juice settle therefrom, or the juice may be immediately filtered. Employing this procedure, a residue is produced which contains coagulated protein, certain phosphates and other substances, including the wax which has been removed from the sugar cane during the pressing operations. This residue varies in consistency and texture, forming a semi-solid or a mud.

It is desired to point out that the filter press mud or the sugar cane mud produced in accordance with the above usually has or is adjusted to have a water content between 60% and 85%. In order to remove the wax from the mud, the latter is extracted with a solvent which is preferably a water-immiscible organic solvent for the wax. The particular kind of solvent used for the extraction of the wax is of minor importance in carrying out the present invention, as the paramount consideration is that the wax and waxy constituents be removed from the sugar cane mud. The common solvents which may be used are toluene, benzene or xylol. Also, the xylenes, hexanes, heptanes and octanes may be used. These wax solvents and their equivalents may be used in an amount varying between 0.5 pound to 20.0 pounds, taken on the weight of the dry filter press mud. The mixture of the mud and the solvent may be heated as, for example, to 170° F. and the wax recovered by countercurrent extraction, and the solvent removed from the wax and recovered by distillation. The extracted mud is freed from its solvent at a temperature as high as 230° F. The extracted mud therefore carries relatively little water-content. However, this is not of importance in carrying out the present invention as the dewaxed mud functions equally well in the presence of a material water-content which may be as high as 35%. The wax may also be extracted from the sugar cane mud by drying the cake and then extracting the dry cake with benzene or a petroleum fraction dissolving between 190° F. and 230° F., preferably about 212° F. or 100° C. The dry cake is extracted with a solvent at a temperature ranging between 50° C. and 78° C., depending upon the composition of the wax which is to be extracted. In some instances, a temperature range between 70° C. and 80° C. appears to give more satisfactory results. The solvent may then be recovered by distillation from the crude wax and also from the extracted mud.

When the filter press or sugar cane mud is treated by the dry process above set forth to produce a substantially dry extracted product, it has been ascertained that the mud has a rather low concentration of viable micro-organisms. Therefore, in order not to kill the viable micro-organisms in the filter press mud, it is preferred to use the wet process. In carrying out the present invention the dewaxed filter press mud may be adjusted to have a water-content ranging between 20% and 50%.

It has been stated that the filter press mud contains substantial quantities of phosphates and coagulated proteins. The filter press mud also contains an appreciable amount of sugar which is available in carrying out the present invention, in that the sugar serves as a source of energy for any symbiotic fixation of atmospheric nitrogen. Puerto Rican sugar cane mud produced by a single pressing of the sugar cane, after dewaxing, had a sugar content of 3.9%. The same mud produced by double pressing had a sugar content of 1.2%. A dewaxed sugar cane mud from a Cuban factory produced by a single pressing of the sugar cane had a sugar content of 5%. On double pressing, the dewaxed mud had a sugar content of 1.9%.

It is desired to point out that the dewaxed sugar cane mud is not only rich in nitrogen, phosphorus and calcium, but that it is also rich in plant growth factors, such as bioses and vitamins that are liberated from the bacteriological activities that occur in the mud while it is in a wet condition. However, the presence of the wax has always interfered with the utilization of the sugar cane mud as a plant stimulant and a plant food. Further, bacteriologically, the filter press mud is one of the richest substrates for microbial growth, and its floral is exceedingly heterogeneous, as regards the various species that grow in it. This flora is derived from the soil brought into the sugar factory with the sugar cane, the "epiphytic" flora of the sugar cane, and species of micro-organisms derived from the dust and equipment of the sugar cane factory in which the sugar cane is processed.

Freshly made filter press mud contains a large number of micro-organisms and its bacterial population levels are usually very high. The micro-organisms constituting its micro-flora are only partly derived from the soil, a small amount of soil being usually brought into the sugar cane mill with the cane, and consequently it is introduced into the sugar cane juice through milling. The larger portion of the bacteria present in the filter press or sugar cane mud is derived from the equipment and from the growth of these bacteria during processing. It may be stated that the heat used in effecting clarification of the sugar juice usually kills most, if not all of the vegetative forms of organisms, and only the bacteria spores survive. Experiments have shown that the microbial or bacterial population of freshly produced sugar cane mud average four to five million bacteria per gram of the mud. The following Table I indicates the plant growth effects obtained in growing corn in washed river sand, some of the corn being grown in washed river sand to which undewaxed sugar cane mud was added, and some of the corn being grown in washed river sand to which dewaxed sugar cane mud was added.

TABLE I

*Comparison of plant growth produced by (a) addition to river sand of filter press mud (sugar cane mud) before dewaxing, and (b) after dewaxing*

| Filter Press Mud Before Extraction to Dewax | | | | Filter Press Mud After Extraction and Dewaxing | | | |
|---|---|---|---|---|---|---|---|
| Per Cent Mud Added | Days After Planting | Height of Plants, Inches | Per Cent Germination | Per Cent Mud Added | Days After Planting | Height of Plants, Inches | Per Cent Germination |
| 1 | 10 | 9.25 | 50 | 1 | 10 | 11.5 | 50 |
| 5 | 10 | 11.25 | 50 | 5 | 10 | 12.25 | 50 |

Referring to Table I, it is noted that when 1% (dry weight) of the mud taken on the weight of the river sand was added to the soil and the wax was present in the filter press mud, the plant grew, after ten days, to a height of 9.25 inches, and when 5% of the dry mud, taken on the weight of the river sand, was added thereto without dewaxing, the plant attained a height after ten days of 11.25 inches. Utilizing the same kind of mud, but extracting the mud to dewax the same, the same percentages of mud produced a growth of the corn in the river sand of 11.5 and 12.25 inches. In other words, the dewaxing of the filter press or sugar cane mud when using 1% thereof taken on the amount of the river sand added resulted in an increase of approximately two and one-quarter inches in height of the corn after a period of ten days had elapsed; and when adding 5% of the dewaxed mud to the river sand, in ten days, the corn attained a growth two inches higher than that attained using the identical cane sugar mud but in which the wax was present. It is therefore apparent that the dewaxed sugar cane mud stimulated the growth of the bacteria in the river sand to which the dewaxed mud was added.

The ammonifying power of the extracted or dewaxed filter press mud, that is, sugar cane mud, is shown in the following Table II:

TABLE II

*Ammonifying power of extracted filter press mud (sugar cane mud)*

| Series | Soil Treatment | Amount Added, Percent by Weight | Height of Plant, Inches | Days After Planting | Percent Germination |
|---|---|---|---|---|---|
| A | Sand only | | 7 | 13 | 50 |
| B | Sand plus Extracted Filter Press Mud. | 3 | 0 | 13 | 75 |
| C | Sand plus Extracted Filter Press Mud and 10% Protein Product. | 5 | 13.5 | 13 | 75 |

In the treatment set forth in the above table, the protein product used comprised a dehydrated molasses distillery slop which consisted of approximately 10% protein and 27% ash, chiefly potash, the remaining ingredients being those usually present in protein waste products.

Referring to Table II, it is seen that the treatment of the soil or sand with the dewaxed filter press mud in the presence of 5% of a product containing 10% protein, gave a much higher growth than when the same soil was treated with the dewaxed filter press or sugar cane mud alone, thereby indicating the ammonifying power of the sugar cane mud used alone and in the presence of a protein product.

Referring to example B in Table II, three pounds of the dried dewaxed sugar cane mud were added to one hundred pounds of the sand.

Referring to example C in Table II, five pounds of the mixture of the dewaxed sugar cane mud and the protein product were added to one hundred pounds of the sand. The five pounds contained $\frac{1}{10}$ of a pound of 10% protein, or $\frac{1}{100}$ of a pound of pure protein, the latter figure being obtained by reducing the 10% protein product to the equivalent substantially pure protein product. Obviously, the amount of equivalent pure protein product added to the dewaxed sugar cane mud may vary. Broadly, this variation may be within the limits of 0.1% to 2% of the pure product which would be equivalent to between 1% and 20% of a protein product containing 10% protein, the balance being ash and other ingredients usually found in waste protein products.

It is not intended to limit the amount of sugar cane mud added to the sand by 5%. Broadly, the amount of dried filter press mud added to the sand may vary between 0.5% and 10% and more narrowly between 0.5% and 7.5% depending, of course, upon the need of the soil for plant food. A further example is as follows: Ten pounds of the dried dewaxed filter press mud may be mixed with one to two pounds of a protein product containing 10% protein and the latter added in any percentage varying between 0.5% and 10% to the sand or soil.

The following Table II shows the comparative growth of micro-organisms in the extracted or dewaxed sugar cane mud and in the unextracted sugar cane mud containing wax constituents upon the addition of water, just under the saturation point, and incubated at a temperature of 34° C. for one week:

TABLE III

*Rate of microbial growth in unextracted and extracted (dewaxed) cane sugar mud*

| Substance | Original number of Bacteria Per Gram | Number of Bacteria per Gram After One Week |
|---|---|---|
| Unextracted Mud | 4,600,000 | 165,000,000 |
| Extracted Mud (Dewaxed Mud) | 2,300,000 | 176,000,000 |

Referring to Table III, the results set forth indicate that while the extracted or dewaxed mud had a much lower bacterial content at the beginning of the treatment period the bacterial count of the dewaxed mud exceeded the bacterial count of the unextracted mud after a week's storage at 34° C.

A further specific example showing the rate of bacterial growth in undewaxed and dewaxed sugar cane muds is as follows: To ten pounds of sand there is added 0.5 of a pound of dewaxed filter press mud which has been activated by treatment with carbon bisulphide, as herein set forth. To a separate batch of sand of similar weight there is added 0.5 of a pound of undewaxed, unactivated filter press mud. After two weeks not only had plants present in the sand containing the dewaxed, activated filter press mud greatly increased in height over the plants which were present in the sand containing undewaxed, unactivated filter press mud, but the number of bacteria per gram in the mixture of sand and dewaxed, activated sugar cane mud was practically double the number of bacteria per gram in the mixture of sand and undewaxed, unactivated filter press mud.

The above clearly indicates that by dewaxing the sugar cane mud favorable conditions are created in the mud which cause the bacteria therein to rapidly multiply and that when this mud is mixed with soil the number of bacteria in the soil per gram is greatly increased. Further, this increase can be accelerated by activating the dewaxed filter press or sugar cane mud. Instead of using carbon bisulphide to activate the dewaxed sugar cane mud which is mixed with the sand, carbon tetrachloride may be used or any of the other herein set forth volatile activating agents. The dried dewaxed sugar cane mud can be activated by the addition thereto of 10% of carbon bisulphide or 10% of carbon tetrachloride or 10% of any of the agents herein set forth. In general, the amount of activating agent may broadly range between 2% and 10% and more narrowly between 7.5% and 10%, taken on the weight of the dry dewaxed sugar cane mud.

In order to ascertain the stimulative effect of solvents on the rate of bacterial growth in dewaxed filter press or sugar cane mud, fifty grams of sugar cane mud were extracted with benzol to remove the wax from the mud treated. Thereafter, the dewaxed mud was inoculated by the addition of ten grams of garden soil and activated by the addition of 1 cc. of carbon tetrachloride. The amount of carbon tetrachloride or other activating agents used may vary as, for example, 2% of carbon tetrachloride based on the weight of the dry dewaxed mud may be used to activate the same, said mud also being inoculated with ten grams of garden soil. The water holding capacity of this soil was determined by taking 100 cc. of the dry extracted mud and adding water until the mud was fully saturated. The amount of water required for saturation was carefully measured and 65% of this amount was added to bring the moisture-content of the dewaxed mud up to 65% of the saturation point. It has been found in the application of the invention that it is best to operate with a water-content of between 60% and 85%, preferably around 75%. When the water-content of the mud becomes too low, it becomes difficult to operate with the same due to the formation of lumps induced by the stickiness of the material. The presence of the proper amount of water in the mud leads to a smooth body which mixes readily with activating solvents. Agglomeration of the mud particles should be avoided as far as possible.

A control sample was prepared by mixing one hundred grams of the dewaxed mud inoculated with one gram of garden soil and water, enough of the latter being added to bring the moisture-content of the mixture up to 65% of its saturation point. This control did not contain any carbon bisulphide. The so-prepared samples were then placed in closed bottles and incubated at 34° C. for one week. On termination of a week's time, bacteriological analysis was made and the results are set forth in the following Table IV.

TABLE IV

Sample A—Dewaxed filter press mud inoculated with garden soil and treated with 2 per cent by weight of carbon tetrachloride.    165,000,000 bacteria per gram of mixture.

Sample B—Control, same as above but not treated with carbon tetrachloride.    100,000,000 bacteria per gram of mixture.

Sample C—Dried garden soil.    27,000,000 bacteria per gram of soil.

The dewaxed filter press or sugar cane mud activated by treatment with a solvent of the character herein set forth induces the accelerated growth of the micro-organism as shown in Table IV. Further, if the so-treated dewaxed mud which has been activated is added to untreated soil, the solvents present in the mud affect the adjacent particles of the soil and induce a correspondingly effective reaction upon their microbial flora. In one form of the invention it is proposed to mix dewaxed filter press mud with a waste protein product, preferably in the amounts herein set forth, and then further activate this mixture with a volatile activating agent of the character set forth herein, including carbon bisulphide, chlorinated hydrocarbons, including carbon tetrachloride and chloroform, liquid hydrocarbon solvents and hydrocarbon derivatives and seal the composition in cans so that the solvent is retained in the preparation until the composition is ready for use as a soil stimulant. An alternative form of the composition is to inoculate dewaxed filter press mud with beneficial soil micro-organisms and treat the mixture with an activating agent of the character set forth and preferably in the amounts herein set forth, although the amounts are not of great importance. A further modification is to mix the dewaxed filter press mud with the waste protein product of the character and amounts herein set forth, then impregnate the mixture with beneficial soil micro-organisms and then activate the so-prepared mixture with a volatile soil antiseptic activating liquid of the character herein set forth and preferably in the amounts set forth. The dewaxed mud may also be mixed with the activating agent as herein set forth to produce a composition which may be kept indefinitely until used.

All of these compositions may be sealed in cans so that the solvent is retained until ready for use as a soil stimulant. It is preferred to use carbon tetrachloride as the activating agent since it is non-flammable. When the preparation is to be used as a soil stimulant, the seals of the can are broken and the dewaxed sugar cane mud mixture is introduced into the soil in varying amounts, as herein set forth, although these amounts are not of paramount importance. Sufficient of the solvent is then retained in the preparation to also activate the soil particles of the soil to which the preparation has been added. The product of the present invention, as prepared as above set forth, has a high beneficial microbial content and, further, the plant nutrients present in the composition tend to endow the soil to which the composition is added with temporary bacteriostatic properties which later accelerate the growth of the beneficial microorganisms in the soil. Therefore, the dewaxed filter press mud broadly, and in its more limited form when it is activated and/or mixed with a protein agent, serves not only as an excellent fertilizer, but serves as a nucleus for the activation of soil flora. It tends to renovate the soil containing injurious organisms in that it assures a predominance of a flora which induces and produces plant growth.

A specific example is as follows: Ten pounds of dewaxed filter press mud dewaxed by treatment with benzol was thoroughly mixed with one pound of a product containing 10% protein. This mixture was inoculated with a water suspension containing one pound of garden soil. This suspension was made as follows: One pound of the garden soil was added to a large closed container and one liter of water was added to the soil and the mixture thoroughly shaken. Thereafter, the soil was allowed to settle. The supernatent water containing most of the micro-organisms was then added to ten pounds of dewaxed mud. The so-treated sugar cane mud was then reactivated by the addition of one pound of carbon tetrachloride. The carbon tetrachloride may be replaced by any of the activating agents herein set forth, including carbon tetrachloride and toluene. The material was then dried to some extent but not sufficient to drive off the excess of the activating agent, as, for example, carbon bisulphide or carbon tetrachloride, and then placed in sealed containers.

In another experiment, the filter press mud dewaxed with benzol which had admixed therewith 10% of carbon bisulphide. The dewaxed mud was dried to remove the volatile solvent and its water-content. Thereafter, there was added to the dewaxed dried filter press mud 10% of dried soil bacteria culture, said percentage being taken on the weight of the dried dewaxed mud. There was also added 10% of a protein material, namely, a dehydrated molasses distillery slop, said protein material being an impure material, the protein content of which is equivalent to 1% of substantially pure protein. This mixture was then reactivated with carbon tetrachloride in an amount equivalent to 2% taken on the dry weight of the dewaxed mud. Prior to activation with the carbon tetrachloride solution, the dewaxed mud is adjusted to a water-content of 60%.

The original bacterial content of the so-produced mixture, the dewaxed solvent having been removed therefrom, was 1,350,000 bacterial per gram of mixture. The bacterial content of the mixture after one week was 179,000,000 bacterial per gram of mixture. This mixture of dewaxed mud containing the dried soil bacterial culture, the protein and reactivated with 2% carbon tetrachloride had an original mold content of 330,000 molds per gram of mixture.

The accelerated growth of micro-organisms in dewaxed filter press or sugar cane mud retreated with a solvent as herein set forth is also reflected in the increased rate of ammonification or organic nitrogen material as is indicated by the following data based on the incubation of the mud samples for a period of sixteen days at a temperature of 25° C. Each of the samples was moistened to optimum levels for microbial action and left in the incubator for about sixteen days.

TABLE V

*Ammonification of organic nitrogen in filter press or cane sugar mud during a time period of 16 days*

| Series | Treatment | Nitrogen As— | | | |
|---|---|---|---|---|---|
| | | NH₄ p.p.m. | NH₄ percent | NO₃ p.p.m. | NO₃ percent |
| A | Unextracted mud containing wax constituents and 10% of protein product (tankage) | | | | |
| B | Same, with carbon bisulphide extracted | 210 | 0.021 | 28 | 0.0028 |
| C | Same, re-extracted with carbon tetrachloride | 330 | 0.033 | 32 | 0.0032 |
| | | 300 | 0.030 | 22 | 0.0022 |

It has been ascertained that dewaxed filter press or sugar cane mud of the character herein set forth when activated by the activating agents herein referred to accelerates the growth of soil fungi. It is well known that these micro-organisms are essential to the formation of "mycorrhiza" around the roots of plants. In some plants, such as certain species of the orchid, the formation of this mycorrhiza is absolutely essential to the growth of the orchid, and is presumed to act in a symbiotic relationship to these plants. In some cases, the mycorrhiza is termed "endotrophic" inasmuch as the mycelium of the fungi penetrates the roots themselves in the absorption of these nitrogen constituents from the soil. In other instances, the mycorrhiza is "ectotrophic," inasmuch as it does not enter the roots of the plants but does perform the function of rendering available the unassimilable nitrogen contents in the soil and brings them within the sphere of the root system of the plant. It is desired to state that the levels of fungi population in ordinary cultivated soils are, as a rule, much lower than the bacterial levels, the ratio usually being one to five. This, of course, may vary greatly, the important point being that the bacterial level is at least several times that of the fungi level. Unfertilized soils may contain as few as 16,000 fungi per gram of the soil, and the usual range is from 42,000 to 131,000 fungi per gram of soil. This number may be greatly increased by the addition of manure. It has also been discovered that these levels are greatly increased and greatly exceeded when the soil has added thereto dewaxed filter press or sugar cane mud which has been re-activated by the addition of solvents.

It is recognized that the same solvents which are used for removing or extracting wax and waxy constituents from the original raw filter press or sugar cane mud may also be used for activating the dewaxed filter press or sugar can mud. There is usually some difference in the way the solvents are used. During the extraction of the raw filter press or sugar cane mud containing the wax and waxy constituents heat is used and the heat assists in reducing the microbial population of the extracted mud. However, after the wax and waxy constituents have been extracted from the raw mud, it has been ascertained that the treatment of the extracted or dewaxed mud at ordinary temperatures, that is temperatures varying between 70° and 100° F., has the function of first conferring a period of rest upon the micro-organisms present in the dewaxed mud and later on greatly stimulating their reproductive properties.

The second treatment with a solvent is, of course, in much more limited amount.

The following are analyses of filter press mud taken from various standard publications:

TABLE VI

*Analysis of filter press mud as given by Noel Deerr*

| | Per cent |
|---|---|
| Nitrogen content as N | 0.43 |
| Phosphorus as soluble phosphoric acid | 10.40 |
| Insoluble phosphoric acid | 0.12 |
| Available phosphoric acid | 10.28 |
| Potash | 0.27 |

TABLE VII

*Louisiana filter press mud*

| | Per cent |
|---|---|
| Nitrogen content as N | 0.43 |
| Phosphorus as soluble phosphoric acid | 10.40 |
| Insoluble phosphoric acid | 0.12 |
| Available phosphoric acid | 10.28 |
| Potash | 0.127 |

TABLE VIII

*Louisiana filter press mud*

| | Per cent |
|---|---|
| Nitrogen content as N | 0.59 |
| Total phosphoric acid | 3.65 |
| Potash | 0.63 |
| Calcium as calcium oxide | 2.96 |
| pH | 6.90 |
| Water | 2.91 |

TABLE IX

*Filter press mud before extraction*

| | Per cent by weight |
|---|---|
| Nitrogen content as N | 0.798 |
| Nitrogen as protein | 4.99 |
| Phosphorus as P₂O₅ | 4.13 |
| Phosphorus as tricalcium phosphate | 9.05 |
| Potassium as K₂O | 0.821 |
| Loss on ignition as received | 36.05 |
| Moisture content for which the above values have been corrected | 5.99 |

All the above represent analyses of unextracted filter press or sugar cane mud, that is, undewaxed mud.

The filter press mud, the analysis of which is set forth in Table IX, was extracted with solvents and the results obtained are set forth in the following Table X.

TABLE X

*Analysis of filter press mud set forth in Table IX after the mud has been treated with a solvent to remove the wax or waxy constituents*

| | Per cent by weight |
|---|---|
| Nitrogen content as N | 0.894 |
| Nitrogen as protein | 5.57 |
| Phosphorus as $P_2O_5$ | 4.26 |
| Phosphorus as tricalcium phosphate | 9.31 |
| Potassium as $K_2O$ | 1.005 |
| Loss on ignition as received | 31.12 |
| Moisture content from which the above values have been corrected | 4.63 |

It is quite evident that both the raw filter press mud prior to dewaxing, and after dewaxing, contains many of the elements necessary to successfully fertilize poor soils. Roughly, twenty tons of the wet mud, adjusted to a 65% water content, are equivalent to about two hundred pounds each of ammonia, potash and phosphoric acid.

It is quite clear that applicant has produced a dewaxed sugar cane mud which has a microbial population at least equivalent to that present in the original sugar cane mud before removal of the wax constituents and more specifically has a microbial population at least two-fold relative to the microbial population present in the sugar cane mud before the removal of the wax constituents. This increase in microbial population of the dewaxed sugar cane mud is brought about by treatment with a solvent as herein set forth to thereby produce an entirely new product. It is this new product that is added to the soil. Relative to the addition of the product to the soil, it is immaterial how the product was produced. Therefore, applicant does not wish to be limited to the specific method by which the new product is produced.

Referring to Table V, the protein product used was tankage. However, other equivalent protein products may be substituted in the experiments upon which Table V is based as, for example, cotton seed meal and dried blood. It is understood that when the protein product has a protein content greater than 10% correspondingly smaller amount of the protein product may be used. For example, if the protein product had a 20% protein content then, instead of using 10% of the product, only 5% of the product would be used, and if the product had a 50% protein content only 2% of the protein product would be used.

Having thus described the invention, what is claimed as new and desired to be secured by Letters Patent is:

1. The method of treating dewaxed sugar cane mud to adapt it as a plant stimulant and fertilizer, said mud being derived from sugar cane mud which has been dewaxed by the action thereon of a dewaxing solvent, said dewaxing step functioning to decrease the microbial population of the resulting dewaxed mud, said microbial population including species which function as a plant food and a plant stimulant, comprising the dewaxed sugar cane mud with between 2% and 10% of a volatile organic solvent having little germicidal effect on the microbial population of the mud, and retaining a substantial proportion of said solvent in the mud.

2. The method defined in claim 1 in which the treatment of the dewaxed mud with volatile organic solvent is effected at a temperature between the limits of about 70° and 100° F.

3. The method defined in claim 1 in which the volatile organic solvent is a chlorinated hydrocarbon.

4. The method defined in claim 1 in which the volatile organic solvent is carbon bisulphide.

5. The method of providing a preformed plant stimulant and fertilizer composition comprising mixing with soil microflora dewaxed sugar cane mud containing microorganisms functioning as a plant food and plant stimulant, and introducing into the mixture between 2% and 10% of an organic solvent having little germicidal effect on the microbial population of said sugar cane mud and retaining a substantial proportion of said solvent in the resulting mixture.

6. The method defined in claim 5 in which the volatile solvent is a chlorinated hydrocarbon.

7. The method defined in claim 5 in which the volatile solvent is carbon tetrachloride.

8. The method comprising introducing into soil a preformed mixture of dewaxed sugar cane mud and 2 to 10% of a volatile organic activating solvent having little germicidal effect on the microbial population of the mud, said percentage being taken on the weight of the dry dewaxed mud.

9. A sealed container having present a preformed plant stimulant and fertilizer composition adapted to be introduced as a unit into soil to accelerate the growth of soil microorganisms comprising a mixture of (1) cultures of soil microorganisms, (2) dewaxed sugar cane mud, and (3) between 2% and 10% of an activating volatile organic solvent having little germicidal effect on the microorganisms of the dewaxed sugar cane mud, said percentage being taken on the dry weight of the dewaxed sugar cane mud.

10. A sealed container having present a preformed stimulant and fertilizer composition defined in claim 9 in which the activated organic solvent is a chlorinated hydrocarbon.

11. A sealed container having present a preformed stimulant and fertilizer composition defined in claim 9 in which the activated volatile organic solvent is carbon tetrachloride.

12. The method of providing a preformed plant stimulant and fertilizer composition comprising mixing with soil microflora dewaxed sugar cane mud containing microorganisms functioning as a plant food and plant stimulant, and introducing into the mixture an organic solvent in an amount between about 2% and 10% taken on the dry weight of the mud, said organic solvent being selected from the group consisting of carbon tetrachloride and carbon bisulphide, and retaining a substantial proportion of said solvent in the mud.

13. The method of producing a plant food stimulant composition comprising dewaxing sugar cane mud and reactivating the dewaxed mud by mixing therewith 5% to 20%, taken on the dry weight of the mud, of an organic solvent which has little germicidal effect on the microbial population of the dewaxed mud, and retaining a substantial proportion of said solvent in the mud.

14. The method of producing a plant food stimulant composition comprising dewaxing sugar cane mud and reactivating the dewaxed mud by mixing therewith 2% to 10%, taken on the dry weight of the mud, of carbon tetrachloride, and retaining a substantial proportion of said solvent in the mud.

15. The method of producing a plant food composition comprising dewaxing sugar cane mud and reactivating the dewaxed mud by mixing therewith 2% to 10%, taken on the dry weight of the mud, of carbon bisulphide, and retaining a substantial proportion of said solvent in the mud.

WILLIAM L. OWEN.
ALBERT J. ISACKS.

REFERENCES CITED

The following references are of record in the file of this patent:

UNITED STATES PATENTS

| Number | Name | Date |
|---|---|---|
| 1,261,025 | Hoff | Apr. 2, 1918 |
| 1,320,701 | Manns | Nov. 4, 1919 |
| 1,411,088 | Guy | Mar. 28, 1922 |
| 2,009,522 | Rosales | July 30, 1935 |
| 2,428,813 | Rhodes et al. | Oct. 14, 1947 |
| 2,476,974 | Goepfert | July 26, 1949 |

OTHER REFERENCES

Balch—Wax and Fatty By-Products from Sugar Cane—Tech. Report Series, No. 3, Sugar Research Foundation, Inc., N. Y., October 1947, pages 20 and 51.